(12) United States Patent
Khankal et al.

(10) Patent No.: US 9,398,805 B2
(45) Date of Patent: Jul. 26, 2016

(54) TRACK ROLLER FOOD TABLE SLIDE

(71) Applicant: Zodiac Seats US LLC, Gainesville, TX (US)

(72) Inventors: Yogesh V. Khankal, Denton, TX (US); Jeffery A. Napier, Denton, TX (US); Juan Hernandez, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 166 days.

(21) Appl. No.: 14/190,342

(22) Filed: Feb. 26, 2014

(65) Prior Publication Data

US 2014/0241650 A1 Aug. 28, 2014

Related U.S. Application Data

(60) Provisional application No. 61/770,411, filed on Feb. 28, 2013.

(51) Int. Cl.
*F16C 29/04* (2006.01)
*B60N 3/00* (2006.01)
*B64D 11/06* (2006.01)
*A47B 1/10* (2006.01)

(52) U.S. Cl.
CPC . *A47B 1/10* (2013.01); *B60N 3/004* (2013.01); *B64D 11/0638* (2014.12); *F16C 29/045* (2013.01); *A47B 2210/0043* (2013.01); *F16C 2314/72* (2013.01); *F16C 2326/10* (2013.01); *F16C 2326/43* (2013.01)

(58) Field of Classification Search
CPC ............. A47B 1/10; A47B 2210/0043; A47B 2210/0037; A47B 88/06; A47B 88/08; A47B 88/10; A47B 88/14; B64D 11/0638; B60N 3/001; B60N 3/002; B60N 3/004; F16C 29/045; F16C 29/04
USPC ................ 384/17; 297/163–169; 312/334.31, 312/208.1, 334.1, 334.7, 334.8, 334.12, 312/334.27, 334.32, 334.33, 334.39; 108/50.01, 138, 143; 211/126.15, 151; 248/118.5, 235, 241, 250, 298.1
See application file for complete search history.

(56) References Cited

U.S. PATENT DOCUMENTS 769,024 A * 8/1904 Ryan .................... A47G 25/746
16/96 R
1,315,922 A * 9/1919 Franklin ....................... 108/143
(Continued)

FOREIGN PATENT DOCUMENTS

AT DE 9410903 U1 * 8/1995 ........... A47B 88/044
DE 3941488 C1 * 8/1991 ............. A47B 88/14
(Continued)

*Primary Examiner* — Alan B Waits
(74) *Attorney, Agent, or Firm* — Kilpatrick Townsend & Stockton LLP; Dean W. Russell; Matthew T. Kitces (57) ABSTRACT

An anti-binding slide is disclosed. In certain embodiments, the slide includes a bar having a pin hole adjacent the distal end of the bar. A rolling assembly includes rollers connected by a pin along a roller axis, the pin being positionable in the pin hole. A casing accepts the distal end of the bar. The rollers are positionable within tracks of the casing. The rollers, and thus the distal end of the bar, are able to move within the casing between a compressed position and an extended position. The pin hole provides a clearance fit for the pin, such that small movements of the bar do not interfere with the orientation of the roller axis with respect to the casing.

15 Claims, 6 Drawing Sheets

(56) References Cited

U.S. PATENT DOCUMENTS

| | | | | |
|---|---|---|---|---|
| 2,633,088 A * | 3/1953 | King | ............... | B65G 17/20 105/155 |
| 2,836,469 A * | 5/1958 | Yorinks | ............... | A47B 88/10 384/19 |
| 4,030,609 A * | 6/1977 | Liebetrau | ............... | A47B 88/10 211/162 |
| 4,227,466 A * | 10/1980 | Rooklyn | ............... | A47B 88/14 108/102 |
| 4,482,066 A * | 11/1984 | Dykstra | ............... | A47B 88/10 211/151 |
| 4,952,074 A * | 8/1990 | Rock | ............... | A47B 88/10 384/19 |
| 5,026,176 A * | 6/1991 | Jensen | ............... | A47B 88/10 188/67 |
| 5,484,197 A * | 1/1996 | Hansen | ............... | A47B 88/0485 312/334.12 |
| 5,882,100 A * | 3/1999 | Rock | ............... | A47B 88/10 312/334.33 |
| 6,039,423 A * | 3/2000 | Fulterer | ............... | A47B 88/0485 312/334.29 |
| 6,336,564 B1 * | 1/2002 | Garnier | ............... | A47F 7/286 211/162 |
| 7,214,024 B2 * | 5/2007 | Carrillo Rodriguez | | B65G 1/026 211/151 |
| 7,469,793 B2 * | 12/2008 | Chen | ............... | A47B 53/02 211/162 |
| 8,312,819 B2 * | 11/2012 | Vignal | ............... | B64D 11/0638 108/143 |
| 8,739,986 B2 * | 6/2014 | Preidt | ............... | A47F 5/00 108/187 |
| 8,757,614 B2 * | 6/2014 | Okamoto | ............... | A47B 88/0466 271/145 |
| 8,851,587 B2 * | 10/2014 | Brock | ............... | F16C 29/045 312/334.39 |
| 8,864,087 B2 * | 10/2014 | Goldin | ............... | A47B 13/003 248/222.14 |
| 9,051,145 B2 * | 6/2015 | Yokoyama | ............... | A47B 88/0466 |
| 2008/0092783 A1 * | 4/2008 | Chen | ............... | A47B 1/10 108/84 |
| 2014/0145577 A1 * | 5/2014 | Zimmermann | ............... | A47B 88/0422 312/327 |
| 2014/0318422 A1 * | 10/2014 | Neuhaus | ............... | B60N 2/242 108/44 |
| 2015/0061327 A1 * | 3/2015 | Millan | ............... | B60N 3/004 297/163 |

FOREIGN PATENT DOCUMENTS

| | | | | |
|---|---|---|---|---|
| DE | 102012216658 A1 * | 3/2014 | ............ | F16C 29/045 |
| FR | 2503554 A3 * | 10/1982 | ............ | A47B 88/10 |

* cited by examiner

TRACK ROLLER FOOD TABLE SLIDE

CROSS REFERENCE TO RELATED APPLICATIONS

The present application claims the benefit of U.S. Provisional Patent Application Ser. No. 61/770,411 filed Feb. 28, 2013, which is hereby incorporated by reference in its entirety.

TECHNICAL FIELD

The present disclosure relates to slides generally and more specifically to slides for food tables.

BACKGROUND

Slides can be used in conjunction with food tables, such as those on passenger seats, to extend the food table towards a user. Current food table slides can "bind" while operating. Binding occurs when internal parts stick when the food table is being slid in and out, resisting the sliding motion. Binding or sticking can be undesirable and can prevent the ease of operation of the food table. Whether for use with food tables or for other uses, slides that resist binding can be desirable.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present invention include a slide having a bar and a casing. The bar includes a roller assembly adjacent the distal end of the bar. The casing accepts the roller assembly and bar. The roller assembly includes rollers that travel within tracks of the casing. The roller assembly has a roller axis between the rollers, which is generally perpendicular to a longitudinal axis of the casing. The roller assembly is movably coupled to the bar such that small movements of the bar do not substantially alter the roller axis with respect to the casing. The rollers can be connected by a pin positionable in a pin hole of the bar, the pin hole providing a clearance fit for the pin.

BRIEF DESCRIPTION OF THE DRAWINGS

The specification makes reference to the following appended figures, in which use of like reference numerals in different figures is intended to illustrate like or analogous components

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention provide food table slides for use with a passenger seat. While the food table slides are discussed for use with aircraft seats, they are by no means so limited. Rather, embodiments of the food table slides may be used in passenger seats or other seats of any type or otherwise as desired.

Disclosed herein is a food table slide utilizing track rollers. Use of track rollers can reduce or eliminate the potential for the food table to bind when sliding in or out. In certain embodiments, a slide can include a bar having a pair of rollers at a distal end, where the distal end is enclosed in a casing having a cross section shaped to accept the bar and provide tracks for each roller. Each of the pair of rollers is connected together by a pin positionable within a hole in the distal end of the bar that is clearance fit for the pin. When extended, the rollers roll within the tracks of the casing. The allowable movement of the pin within the hole in the distal end of the bar can aid in reducing slide binding.

Figure 1A:
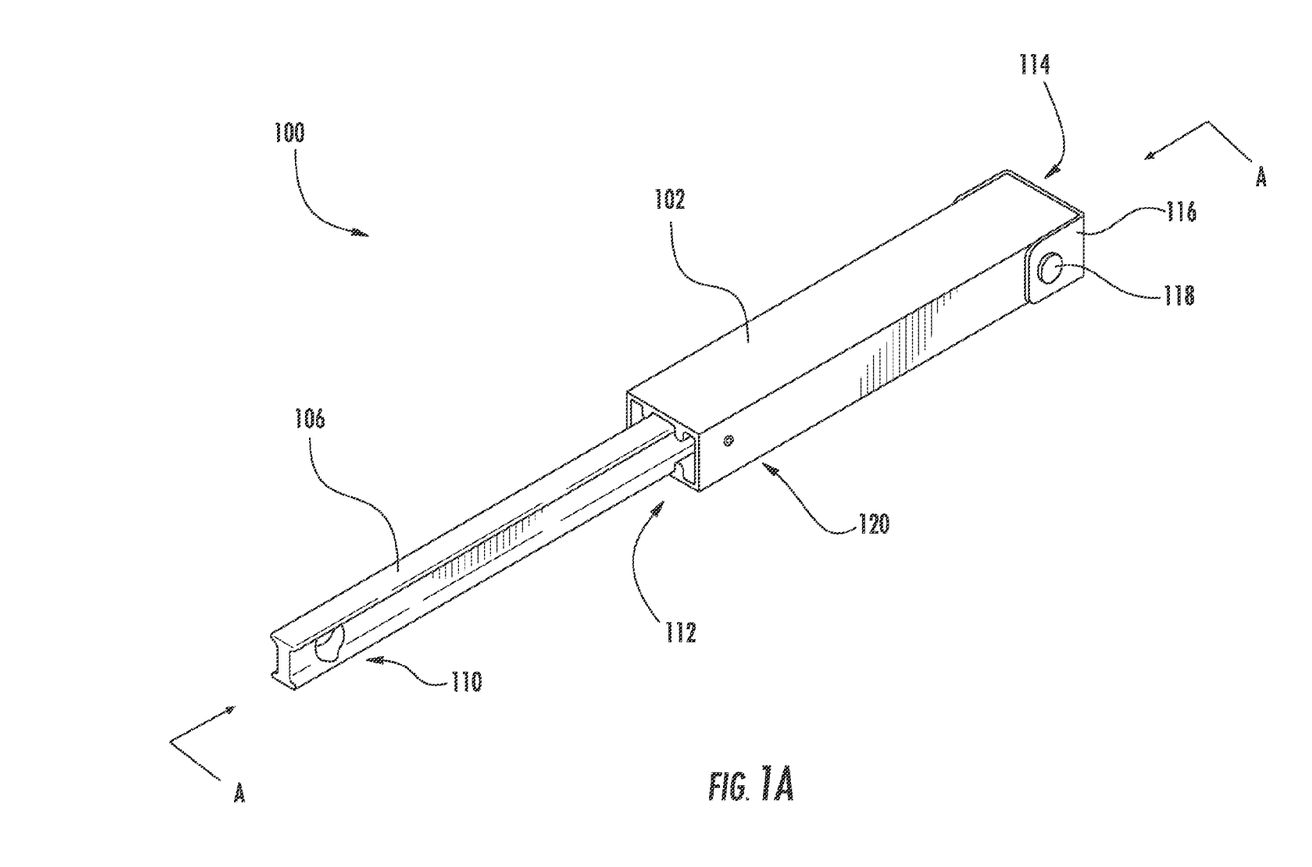
FIG. 1A is an isometric projection of a slide, according to certain embodiments of the present invention.
Figure 1B:
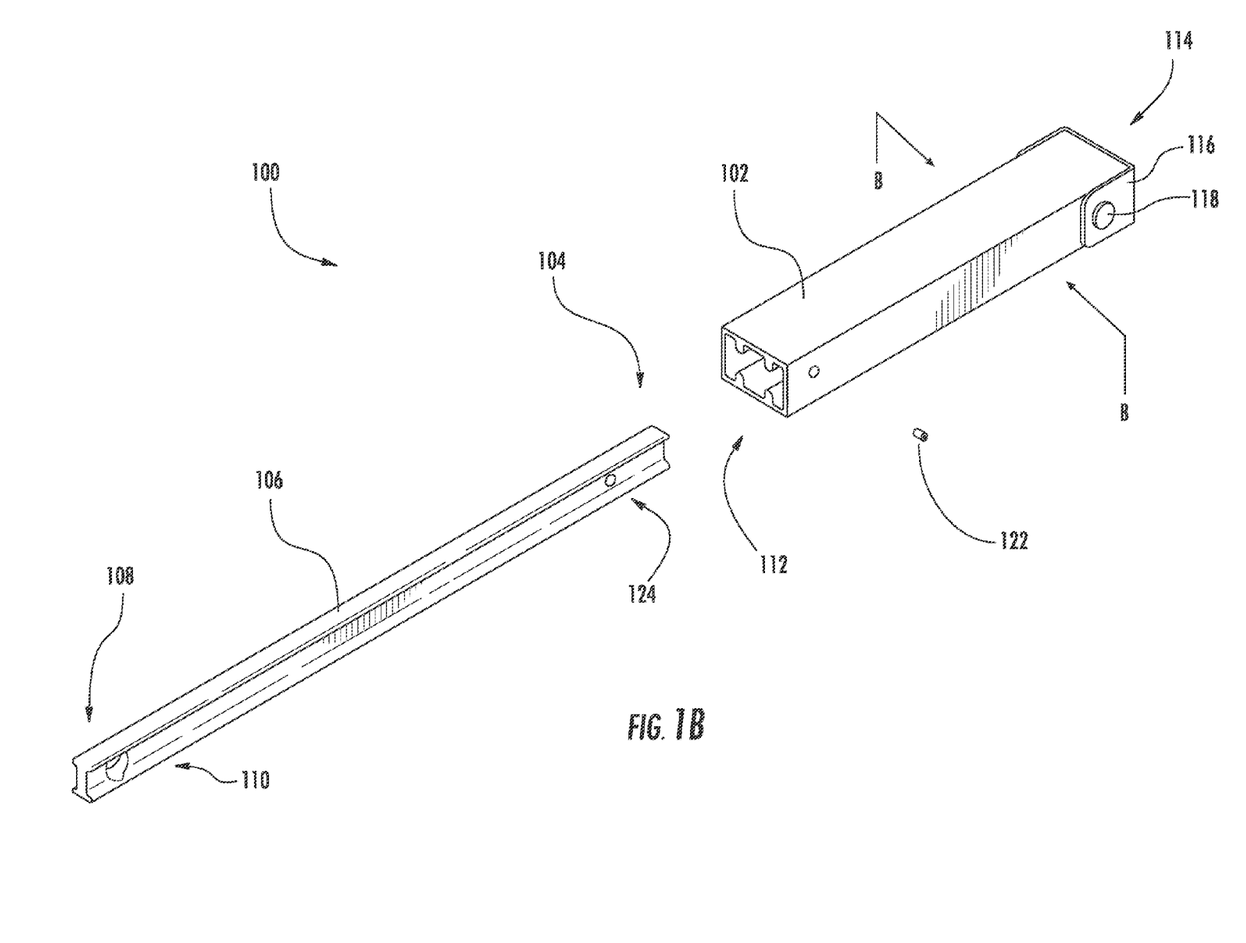
FIG. 1B is a partially-exploded view of the slide of FIG. 1A, according to certain embodiments of the present invention.

FIG. 1A is an isometric projection of a slide 100 according to certain embodiments. FIG. 1B is a partially-exploded view of the slide 100 of FIG. 1A according to some embodiments. The slide 100 includes a casing 102 that accepts a distal end 104 of a bar 106. The bar 106 has a proximal end 108 opposite the distal end 104. The bar 106 includes a mounting hole 110 adjacent the proximal end 108 of the bar 106. The mounting hole 110 can be used to secure the bar 106 to another structure (e.g., a passenger seat). The bar 106 can be mounted with rotational freedom about the mounting hole 110 so that the slide 100 can rotate about the mounting hole 110.

The bar 106 can include a pin hole 124 adjacent the distal end 104 of the bar 106. The pin hole 124 is sized to fit a pin 204, as described in further detail below.

The bar 106 can be I-beam shaped. An I-beam shape can increase the download strength of the slide 100. The thin midsection of the I-beam shape enables the pin hole 124 to be thin, which can provide improved maneuverability of the pin 204 in the pin hole 124, as described in further detail below.

The casing 102 can be made of extruded plastic or any suitable material. The casing 102 can be made using methods other than extrusion. The casing 102 has a proximal end 112 and a distal end 114. The proximal end 112 of the casing 102 accepts the distal end 104 of the bar 106. A stop bracket 116 can be positioned over the distal end 104 of the casing 102. The stop bracket 116 can be attached to the casing 102 by attachment devices 118. The attachment devices 118 can be squeeze rivets. The attachment devices 118 can be other devices capable of attaching the stop bracket 116 to the casing 102 with sufficient strength to ensure the stop bracket 116 can function as desired. The stop bracket 116 can act as a stop for the bar 106, ensuring that the distal end 104 of the bar 106 does not slide past the distal end 114 of the casing 102. When the bar 106 has been slid into the casing 102 such that the distal end 104 of the bar 106 is adjacent the stop bracket 116, the slide 100 is considered to have reached its compressed position. Other designs of stop brackets 116 can be used as long as the stop bracket 116 is capable of stopping the distal end 104 of the bar 106 from sliding past the distal end 114 of the casing 102, regardless of whether the stop bracket 116 fully occludes the distal end 114 of the casing 102. In some embodiments, the attachment devices 118 (e.g., squeeze rivets) can function as the mechanical block that stops travel of the bar 106 with respect to the casing 102 in the compressed position.

In certain embodiments, the casing 102 includes a proximal stop 120. The proximal stop 120 can be a set screw 122. The proximal stop 120 can stop the slide 100 from extending (i.e., bar 106 sliding out of casing 102) past a set point, as described in further detail below.

Figure 2A:
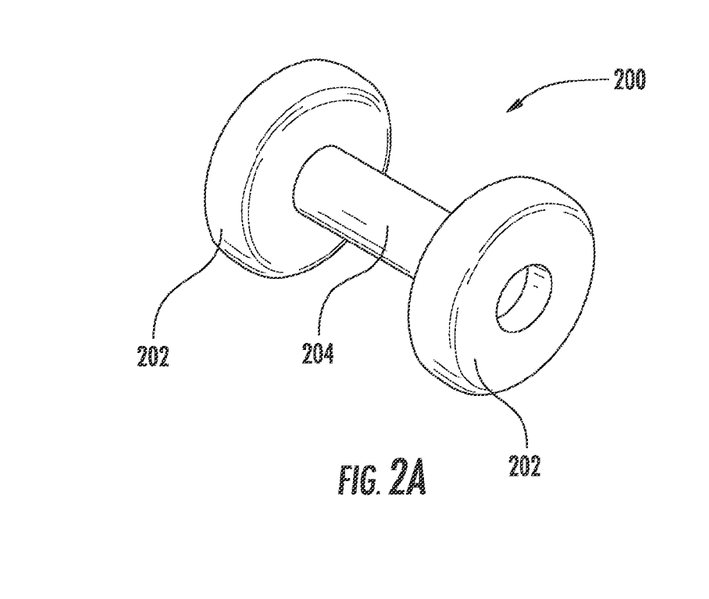
FIG. 2A is an isometric projection of a roller assembly 200, according to certain embodiments of the present invention.

FIG. 2A is an isometric projection of a roller assembly 200 according to certain embodiments. The roller assembly 200 includes two rollers 202 separated by a pin 204. The pin 204 can be threaded to accept corresponding threads on each of the rollers 202. The rollers 202 can be rotationally fixed or rotationally free with respect to the pin 204.

Figure 2B:
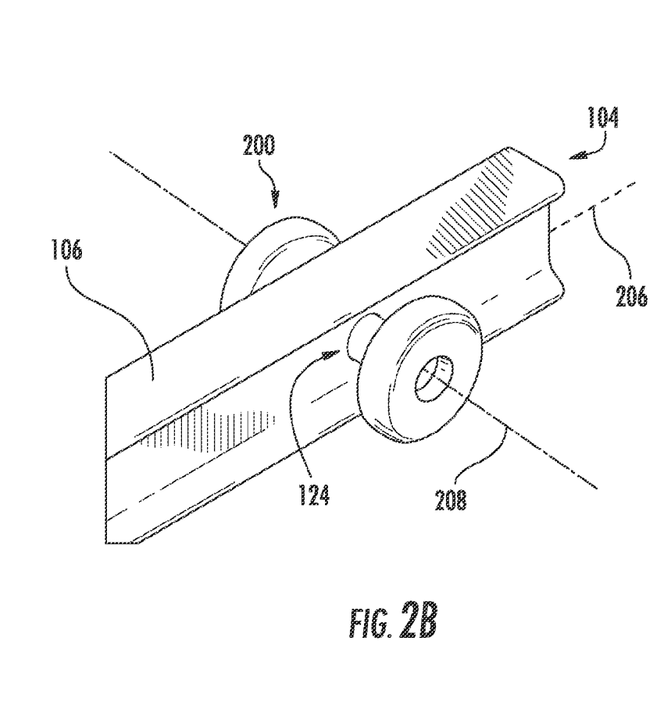
FIG. 2B is an isometric projection of a distal end of a bar having a roller assembly, according to certain embodiments of the present invention.

FIG. 2B is an isometric projection of the distal end 104 of the bar 106, according to certain embodiments. A roller assembly 200 is attached to the bar 106. The roller assembly 200 is positioned across the pin hole 124 so that the pin 204 of the roller assembly 200 is within the pin hole 124. The diameter of the pin hole 124 is sized with respect to diameter of the pin 204 to establish a clearance fit. Because of the clearance fit, the pin 204 is able to move within the pin hole 124. In some embodiments, the pin 204 is rotationally free with respect to the bar 106. In some embodiments, the clearance fit is wide enough to allow the bar 106 to tilt with respect to the pin 204 (e.g., so a longitudinal axis 206 of the bar 106 is not perpendicular to a roller axis 208 defined by the rollers 202).

In alternate embodiments, a roller assembly 200 can include a plurality of rollers 202 attached to the bar 106 near the distal end 104 of the bar 106. The rollers 202 can be attached to the bar 106 by ball-and-socket joints. In some embodiments, the ball-and-socket joint is located at the pin hole 124. In other embodiments, no pin hole 124 exists, and the roller assembly 200 is attached to the bar by other attachment devices. The rollers 202 can be attached to the bar 106 using other attachment methods as long as the bar 106 retains some freedom of movement with respect to the rollers 202. Specifically, it can be desired for the bar 106 to have at least two degrees of freedom with respect to an axis defined by the rollers 202.

Figure 3:
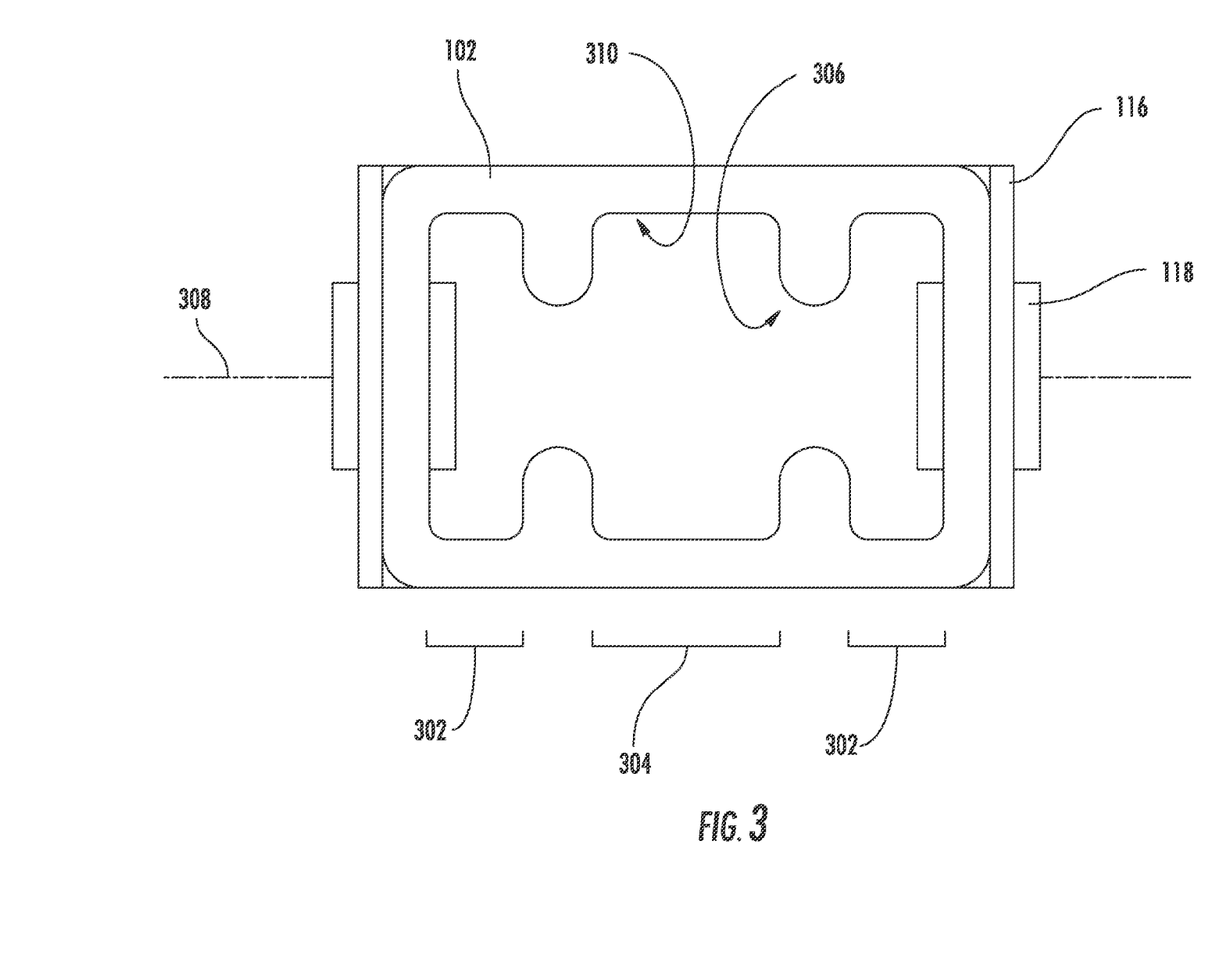
FIG. 3 is a cross-sectional view of the casing of FIG. 1B taken across plane B:B, according to certain embodiments of the present invention.

FIG. 3 is a cross-sectional view of the casing 102 of FIG. 1B taken across plane B:B according to some embodiments. The attachment devices 118 (e.g., squeeze rivets) retain the stop bracket 116 to the distal end 114 of the casing 102. The casing 102 has an inner surface 310 including inner protrusions 306 forming two tracks 302 and a center slot 304. The center slot 304 is shaped to accept the bar 106, while the tracks 302 are shaped to accept the rollers 202 of the roller assembly 200. The casing 102 has a lateral axis 308.

Figure 4:
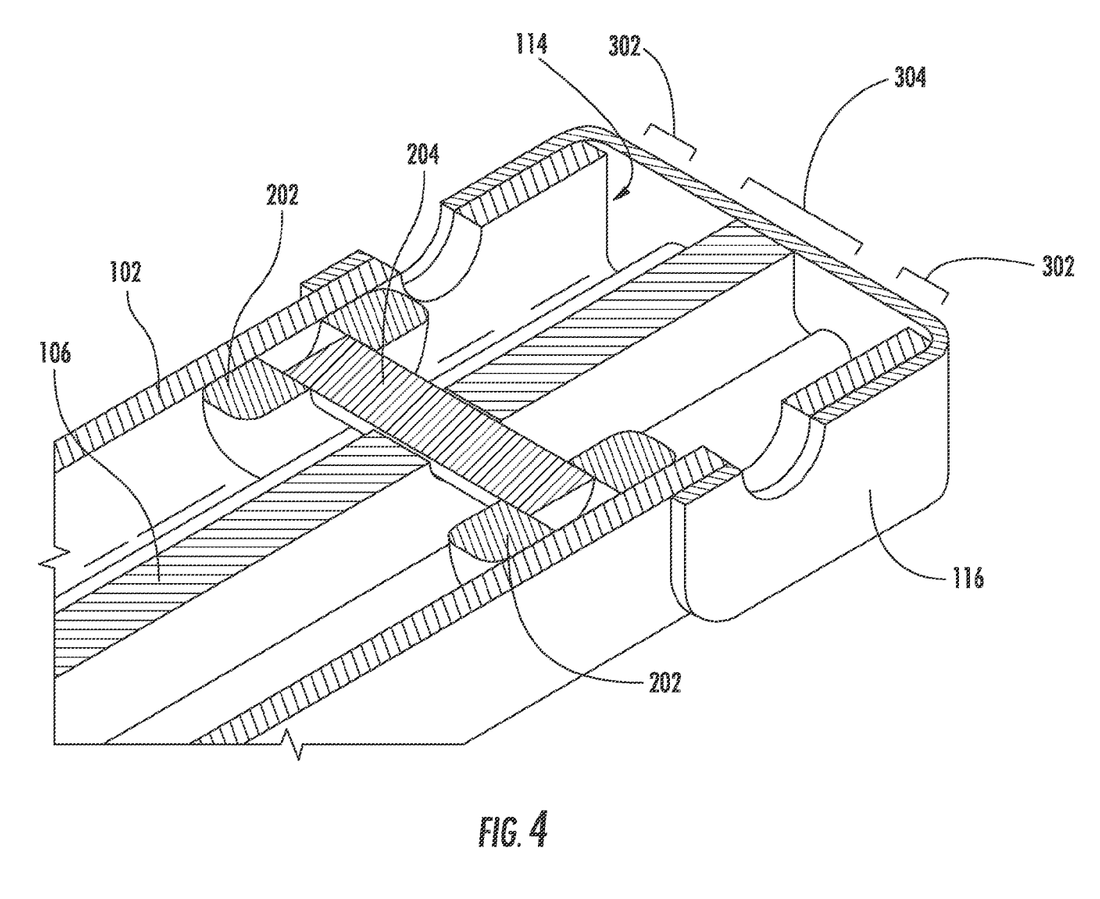
FIG. 4 is a cross-sectional view of the casing of FIG. 1A taken across plane A:A with the attachment devices removed, according to certain embodiments of the present invention.

FIG. 4 is a cross-sectional view of the casing 102 of FIG. 1A taken at plane A:A with the attachment devices 118 removed according to certain embodiments. The bar 106 fits in the center slot 304. The rollers 202 fit in the tracks 302. The bar 106 is able to slide within the casing 102 as the rollers 202 either roll or slide within their respective tracks 302. The movement provided by the clearance fit between the pin hole 124 of the bar 106 and the pin 204 can allow the bar 106 to move slightly within the center slot 304 without altering the roller axis 208. The roller axis 208 is able to remain substantially parallel to the lateral axis 308 of the casing 102 despite a certain level of movement of the bar 106 within the casing 102. As long as the roller axis 208 remains substantially parallel to the lateral axis 308 of the casing 102, the bar 106 will be able to slide in and out of the casing 102 without binding or sticking. The bar 106 can slide between a compressed position and an expanded position without binding or sticking, without the need to carefully align the bar 106 with the casing 102.

Figures 5A, 5B:
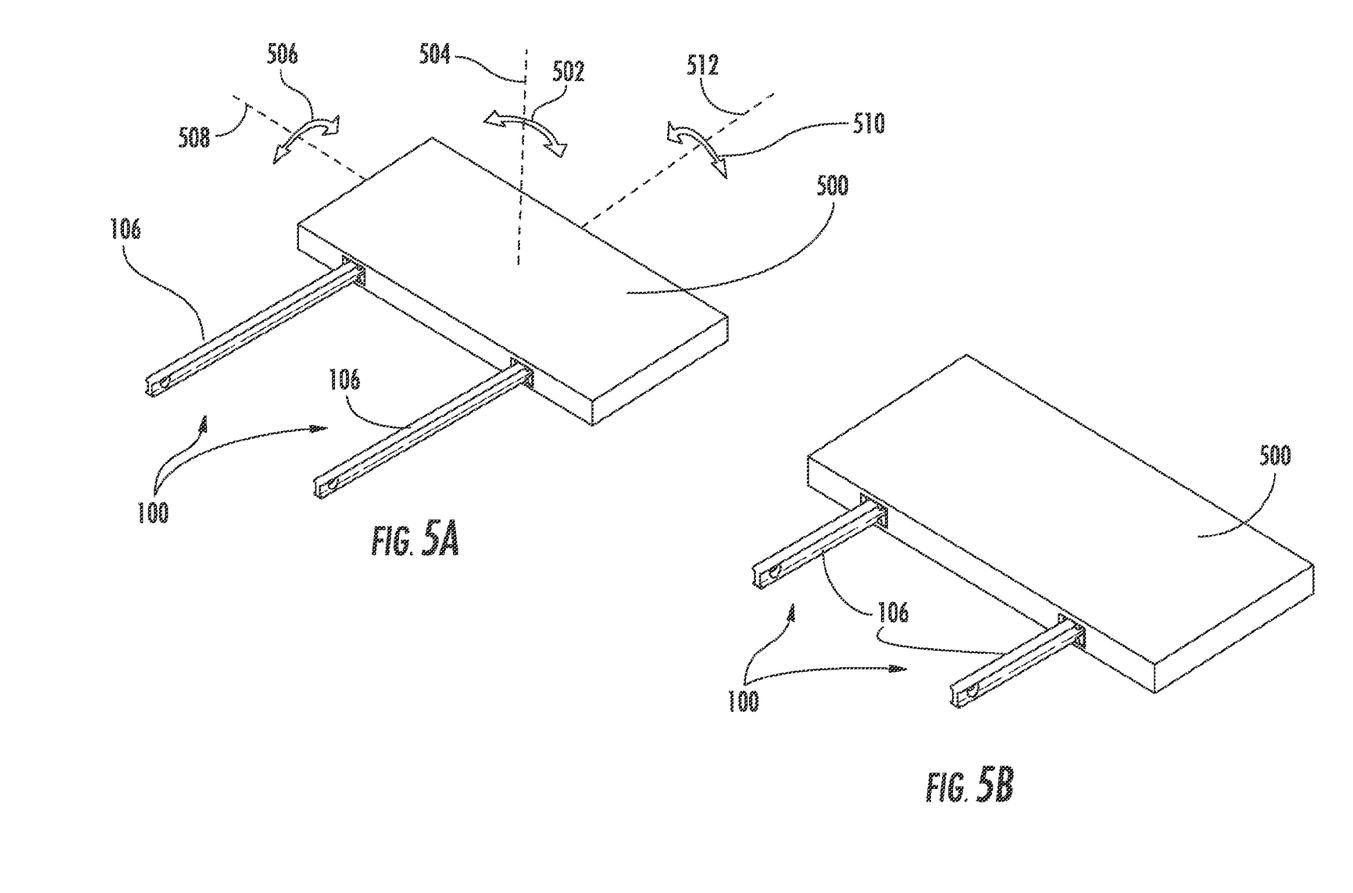
FIG. 5A is an isometric view of a table in an extended position incorporating two slides, according to certain embodiments of the present invention.
FIG. 5B is an isometric view of the table of FIG. 5A in a compressed position, according to certain embodiments of the present invention.

FIG. 5A is an isometric view of a table 500 incorporating two slides 100 according to some embodiments. The table 500 is in an extended position. The slides 100 disclosed above enable the table 500 to move between an extended position and a compressed position with ease. When used, the table 500 can undergo yaw-like twisting (i.e., in directions 502 about z-axis 504), pitch-like twisting (i.e., in directions 506 about y-axis 508), or roll-like twisting (i.e., in directions 510 about x-axis 512). The slides 100, as disclosed above, resist binding and sticking when the table 500 undergoes combinations of yaw-like twisting, pitch-like twisting, and roll-like twisting.

FIG. 5B is an isometric view of the table 500 of FIG. 5A according to certain embodiments. The table 500 is shown in a compressed position. The slides 100 are shown supporting a surface which is a table 500. The casing 102 of the slides 100 can be attached to, formed of, or positioned under any supported object (e.g., a table 500) in order to support that object.

The slide 100 disclosed herein can resist binding. This slide 100 can enable easier use of tables 500 (e.g., passenger tray tables). This slide 100 can enable easier one-handed operation of tables 500 (e.g., passenger tray tables). This slide 100 has an improved appearance over other slides. This slide 100 is lighter than other slides. This slide 100 does not need substantial lubrication to operate without binding, which can be desirable at least because lubrication can be messy and potentially hazardous in various settings, such as when used on passenger tray tables that are to be handled by passengers. This slide 100 can resist binding without substantial cost and/or use of materials.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An anti-binding slide comprising:
    a bar having a top portion and a bottom portion separated by a midsection having a width that is smaller than a width of the top portion and smaller than a width of the bottom portion, the bar including:
        a distal end;
        a proximal end;
        a mounting hole adjacent the proximal end; and
        a pin hole adjacent the distal end;
    a roller assembly having two rollers axially spaced apart and connected by a pin retained in the pin hole, the pin shaped to provide a clearance fit with the pin hole, wherein each of the two rollers extends laterally past the top portion and the bottom portion;
    a casing having a distal end and an open proximal end operable to accept the distal end of the bar, the casing including a pair of laterally spaced tracks for accepting the two rollers of the roller assembly;
    a surface supported by the casing;
    wherein the bar is operable to travel with respect to the casing between a compressed position and an extended position.

2. A passenger seat incorporating the anti-binding slide of claim 1, wherein:
    the mounting hole of the anti-binding slide is mounted to the passenger seat; and
    the surface is a tray table.

3. A system, comprising:
    a bar having a distal end and a proximal end;
    a roller assembly comprising at least two rollers positioned adjacent opposing sides of the bar, wherein a lateral width across the at least two rollers is greater than a maximum lateral width across the bar;
    a casing having a distal end and an open proximal end operable to accept the distal end of the bar, the casing including a center slot for accepting the bar, a first track for accepting one of the at least two rollers, and a second track for accepting another of the at least two rollers;
    wherein the roller assembly is operable to rotate between the bar and the casing as the bar slides between a compressed position and an extended position.

4. The system of claim 3, wherein the at least two rollers are connected by a pin positioned in a pin hole of the bar, and wherein the pin hole provides a clearance fit for the pin.

5. The system of claim 1, wherein the bar includes a top portion and a bottom portion separated by a midsection having a width that is smaller than a width of the top portion and smaller than a width of the bottom portion.

6. The system of claim 3, additionally comprising a first stop and a second stop, wherein:
    the first stop is positioned to stop travel of the roller assembly within the casing at the compressed position; and
    the second stop is positioned to stop travel of the roller assembly within the casing at the extended position.

7. The system of claim 6, wherein:
    the second stop is a set screw positioned adjacent the proximal end of the casing;
    the first stop is a stop bracket positioned adjacent the distal end of the casing; and
    the stop bracket engages the distal end of the bar to stop travel of the roller assembly.

8. The system of claim 3, wherein the casing is formed from extruded plastic.

9. The system of claim 8, wherein the distal end of the casing is covered by a stop bracket.

10. The system of claim 3, wherein the casing supports a surface.

11. The system of claim 10, wherein the surface is a tray table.

12. The system of claim 10, wherein:
    the bar includes a mounting hole adjacent the proximal end of the bar for securing the bar to a structure.

13. The system of claim 12, wherein the structure is a passenger seat.

14. An assembly, comprising:
    a casing supporting a surface;
    a bar including a proximal end and a distal end, the bar being rotationally coupled to a structure via a mounting hole adjacent the proximal end, the distal end being movably positionable within the casing between a compressed position and an extended position; and
    a roller assembly coupled to the bar adjacent the distal end, the roller assembly including a first roller and a second roller, wherein each of the first roller and second roller extends laterally beyond a width of the bar, wherein the first roller of the roller assembly is connected to the second roller by a pin positioned within a pin hole of the bar, and wherein the casing includes a first track for accepting the first roller; a second track for accepting the second roller; and a center slot for accepting the bar.

15. The assembly of claim 14, wherein the surface is a tray table and the structure is a passenger seat.

* * * * *